United States Patent
Chen et al.

(10) Patent No.: US 6,792,566 B2
(45) Date of Patent: Sep. 14, 2004

(54) METHOD AND APPARATUS OF PRE-LOADING A SEED FOR A TEST CODE OF A PHYSICAL LAYER DEVICE

(75) Inventors: Chung-Heng Chen, Chiai (TW); Chin-Chi Chang, Fengyuan (TW)

(73) Assignee: Via Technologies, Inc., Taipei (TW)

( * ) Notice: Subject to any disclaimer, the term of this patent is extended or adjusted under 35 U.S.C. 154(b) by 543 days.

(21) Appl. No.: 09/814,826

(22) Filed: Mar. 23, 2001

(65) Prior Publication Data

US 2001/0029594 A1 Oct. 11, 2001

(30) Foreign Application Priority Data

Mar. 24, 2000 (TW) .......................................... 89105531

(51) Int. Cl.⁷ .......................... G06F 11/00; H04L 9/00
(52) U.S. Cl. ........................ 714/739; 380/268; 380/46
(58) Field of Search .............................. 714/739, 738, 714/742; 380/46, 47, 49, 268, 275; 341/69, 50

(56) References Cited

U.S. PATENT DOCUMENTS

| | | | | |
|---|---|---|---|---|
| 5,530,959 A | * | 6/1996 | Amrany | 380/268 |
| 5,590,200 A | * | 12/1996 | Nachman et al. | 380/46 |
| 5,621,799 A | * | 4/1997 | Katta et al. | 380/217 |
| 6,177,890 B1 | * | 1/2001 | Keirn et al. | 341/59 |
| 6,351,538 B1 | * | 2/2002 | Uz | 380/201 |

* cited by examiner

Primary Examiner—Christine T. Tu
(74) Attorney, Agent, or Firm—Rabin & Berdo, P.C.

(57) ABSTRACT

A method and an apparatus of loading a pre-load seed for a test code of a physical layer device (PHY). For a physical layer device including a scrambler and a Non-Return-to-Zero/Non-Return-to-Zero-Inverted (NRZ/NRZI) converter connected to the scrambler, where the NRZ/NRZI converter receives an NRZ signal outputted by the scrambler, and outputs an NRZI signal, the method includes the following steps. (a) Determine whether a plurality of starting bits of a frame are present. (b) Repeat from step (a) if the starting bits are not present. (c) Load the pre-load seed to the scrambler and transmitting the test code. (d) Set the NRZI signal in a high level when the NRZI signal is not in the high level. On the other hand, for a physical layer device having a descrambler, the method includes the steps of: (a) determining whether a plurality of starting bits of a frame are present; and (b) loading the pre-load seed to the descrambler to retrieve the test code. According to the invention, a frame starting-bits detector is used to determine the correct time to load the pre-load seed.

20 Claims, 9 Drawing Sheets

METHOD AND APPARATUS OF PRE-LOADING A SEED FOR A TEST CODE OF A PHYSICAL LAYER DEVICE

This application incorporates by reference Taiwanese application Ser. No. 89105531, filed on Mar. 24, 2000.

BACKGROUND OF THE INVENTION

1. Field of the Invention

The invention relates to a method and an apparatus of loading a seed for a test code of a physical layer device (PHY), and more particularly to a method and an apparatus of loading a pre-load seed to a scrambler and a descrambler of a PHY so as to correctly load a test code to the PHY for testing the quality of the PHY.

2. Description of the Related Art

Computer networks for searching for information, sending email, etc have become indispensable in today's industry, academia, and daily lives. Computer networks include wide area networks (WAN), such as Internet, and local area network (LAN), such as an Ethernet LAN. Usually, a personal computer connects to another computer through a computer network, such as the Internet, either by a modem or a network interface card (NIC).

FIG. 1 is a block diagram illustrating the connecting relationships between PHYs of a transmitting end and a receiving end. Referring to FIG. 1, a PHY 102 receives signals from a media independent interface (MII) 100. After the signals are processed, they are transmitted through a transformer 104 which filters out the DC components of the signals and sends the resulting signals to a medium 106, such as a cable. Then, a PHY 110 at the receiving end receives the signals from transformer 108 and transmits the signals to a MII 112 for further processing.

FIG. 2A is a block diagram illustrating the internal structure of the PHY 102 of the transmitting end shown in FIG. 1, wherein a scrambler 206 uses a seed to scramble data. FIG. 2B is a block diagram illustrating the internal structure of the PHY 110 of the receiving end shown in FIG. 1, wherein a descrambler 218 uses a seed to descramble the scrambled data. Referring to FIG. 2A, 4-bit (4B) symbols, which are transmitted from the MII 100 to the PHY 102, are converted to 5-bit (5B) symbols by a 4B/5B converter 202. Then, a parallel/serial (P/S) converter 204 receives the resulting 5B symbols and converts it from parallel to serial symbols. Next, the scrambler 206 uses a seed to scramble serial symbols to a non-return-to-zero (NRZ) signal, wherein NRZ is a coding scheme. Then, an NRZ/NRZI converter 208 converts the NRZ signal to a non-return-to-zero-inverted (NRZI) signal, wherein NRZI is also a coding scheme. Afterwards, an NRZI/MLT3 converter 210 converts the NRZI signal to a multiple-level-transmit 3 (MLT3) signal, wherein MLT3 is a coding scheme for transmission in 100 MHz Ethernet.

Referring to FIG. 2B, the MLT3 signal outputted by the NRZI/MLT3 converter 210 shown in FIG. 2A is transmitted through a transmission line to the PHY 110 of the receiving end. The MLT3/NRZI converter 214 receives the MLT3 signal and converts it to an NRZI signal. The NRZI/NRZ converter 216 receives the NRZI signal and converts it to an NRZ signal. Then, a descrambler 218 uses the seed to descramble the NRZ signal to the original serial symbols before being scrambled. An S/P converter 220 converts the serial symbols to parallel symbols and transmits the results to a 5B/4B converter. Afterwards, 5B symbols of the serial symbols are converted to 4B symbols. Then, the 4B symbols are transmitted to the MII 112.

During the process of the transmission, if 5B symbol matches with the seed used by the scrambler 206, the output of the scrambler 206 is in the low level. Then, the level of the NRZI signal is kept constant so as to fix the MLT3 signal in one of the three levels, i.e. the low level, high-resistance level, or the high level. However, when the level of the MLT3 signal is kept in low or high, the DC component of the MLT3 signal either increases or decreases, which results in the so-called base line wander phenomenon.

The base line wander phenomenon is caused basically by transformers in the transmitting end and the receiving end. The transformers can filter out the DC component of a signal while allowing the AC component to be transmitted. The DC component of the MLT3 signal influences the base line wander phenomenon. When the base line wander phenomenon exceeds the tolerance of PHY 212, the received signals are then erroneous.

As a result, the degree of the base line wander phenomenon can be used as a basis for testing the quality of PHY. For example, the test pattern for baseline wander measurements defined in ISO9314-1 standard provides a 9000-symbol fiber distributed data interface (FDDI) frame as a worst case pattern to test the quality of PHY.

A PHY tester, in a testing house, can generate a "test vector" containing the exact period for transmitting the first 5B symbol and an idle period with precise and complicated computation. Therefore, when to generate the correct seed can be predicted. However, too much time is required for the PHY tester to generate the test vector and the cycle-based operation is inefficient. Also, the cost is high. Specifically, these disadvantage the chip designer a lot. Moreover, it is difficult to test the test vector on a bench board directly since an expensive pattern for baseline wander measurements generator is required to control the precise timing and generate the pattern for baseline wander measurements.

SUMMARY OF THE INVENTION

It is therefore an object of the invention to provide a method and an apparatus of loading a pre-load seed for a test code of a physical layer device (PHY). According to the invention, a frame starting-bits detector is used to determine the correct time to pre-load the seed. In addition, a feedback controller is used to keep the NRZI signal in the high level, which allows the correct transmitting and receiving of the test code possible. In this way, the test code can correspond to a pattern for baseline wander measurements, such as one defined in ISO9314-1. Thus, the quality of a PHY can be tested and both cost and time can be reduced.

The invention achieves the above-identified objects by providing a method of loading a pre-load seed for a test code of a physical layer device. The physical layer device includes a scrambler and a Non-Return-to-Zero/Non-Return-to-Zero-Inverted (NRZ/NRZI) converter, and the NRZ/NRZI converter is connected to the scrambler, receives an NRZ signal outputted by the scrambler, and outputs an NRZI signal. The method includes the following steps. (a) Determine whether a plurality of starting bits of a frame are present. (b) Repeat from step (a) if the starting bits are not present. (c) Load the pre-load seed to the scrambler. (d) Set the NRZI signal in a high level when the NRZI signal is not in the high level, and keep the NRZI signal in the high level when the NRZI signal is in the high level. (e) Transmit the test code.

The invention achieves the above-identified objects by providing a method of loading a pre-load seed of a test code in a physical layer device having a descrambler. The method includes the steps of: (a) determining whether a plurality of starting bits of a frame are present; and (b) loading the pre-load seed to the descrambler to retrieve the test code.

The invention achieves the above-identified objects by providing an apparatus of loading a pre-load seed of a test code of a physical layer device (PHY). The PHY includes a scrambler and a Non-Return-to-Zero/Non-Return-to-Zero-Inverted (NRZ/NRZI) converter. The NRZ/NRZI converter is used for receiving an NRZ signal outputted by the scrambler and outputting an NRZI signal. The apparatus includes a seed-preload controller. The seed-preload controller receives a first signal inputted to the scrambler and the NRZI signal, and is used for detecting a number of starting bits of a frame of the test code, outputting a loading seed signal to the scrambler to load the pre-load seed, and keeping the NRZI signal in a high level when the NRZI is in the high level. In addition, the seed-preload controller sets the NRZI signal in the high level by changing a bit of a first symbol of the test code when the loading seed signal is asserted and the NRZI signal is in a low level. Besides, the seed-preload controller includes a frame starting-bits detector and a feedback controller. The frame starting-bits detector receives the first signal, and is employed to detect the plurality of starting bits of the frame and output the loading seed signal to the scrambler. The feedback controller receives the NRZI signal, and is used for keeping the NRZI signal in the high level.

The invention achieves the above-identified objects by providing an apparatus of loading a pre-load seed of a test code in a physical layer device (PHY) having a descrambler. The apparatus includes a frame starting-bits detector. The frame starting-bits detector receives output of the descrambler and is used for detecting the starting bits of a frame of the test code and outputting a loading seed signal to the descrambler to load the pre-load seed.

The invention achieves the above-identified objects by providing a physical layer device (PHY) for transmitting and receiving data, which has a scrambler, a descrambler, and a Non-Return-to-Zero/Non-Return-to-Zero Inverted (NRZ/NRZI) converter. The NRZ/NRZI converter is used to receive an NRZ signal outputted by the scrambler and output an NRZI signal. The physical layer device includes a first frame starting-bits detector, a feedback controller, and a second frame starting-bits detector. The first frame starting-bits detector receives a first signal inputted to the scrambler, and is used for detecting a number of starting bits of a frame and outputting a first loading seed signal to the scrambler to load the pre-load seed. The feedback controller receives the NRZI signal, and is used for keeping the NRZI signal in a high level. The second frame starting-bits detector receives an output of the descrambler, and is used for detecting the starting bits of the frame and outputting a second loading seed signal to the descrambler. Besides, the feedback controller sets the NRZI signal in the high level by changing a bit of a first symbol of the test code when the first loading seed signal is asserted and the NRZI signal is in a low level.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
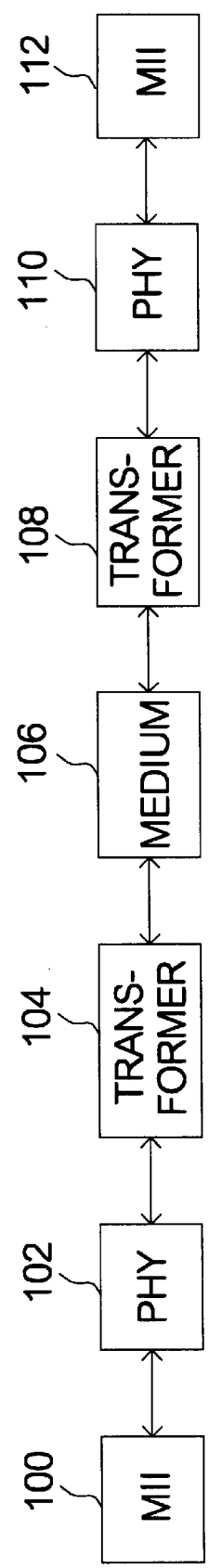
FIG. 1 (Prior Art) is a block diagram illustrating the relationship between two PHYs of a transmitting end and a receiving end respectively.
Figure 2A:
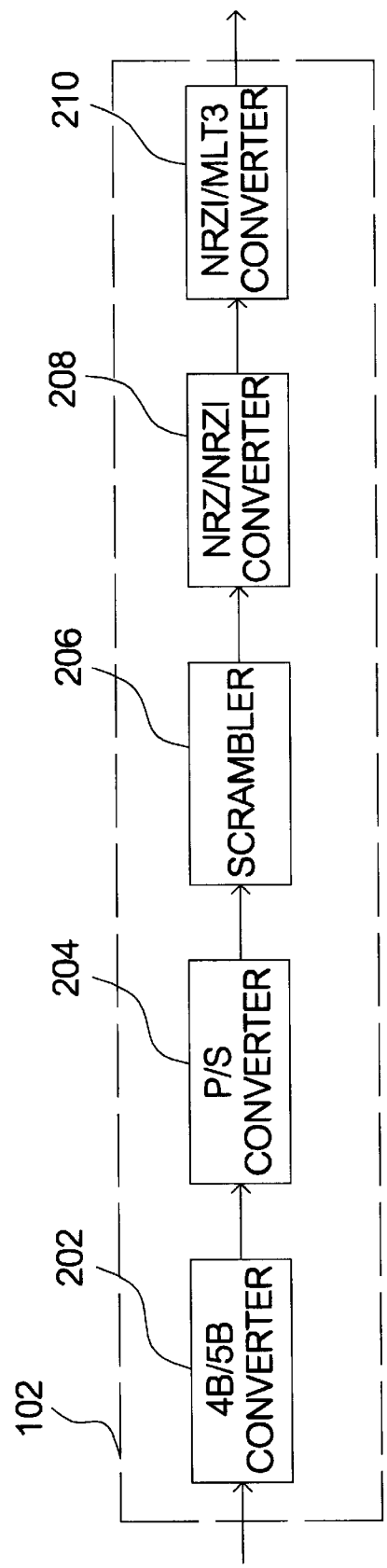
FIG. 2A (Prior Art) is a block diagram illustrating the internal structure of the PHY 102 of the transmitting end shown in FIG. 1.
Figure 2B:
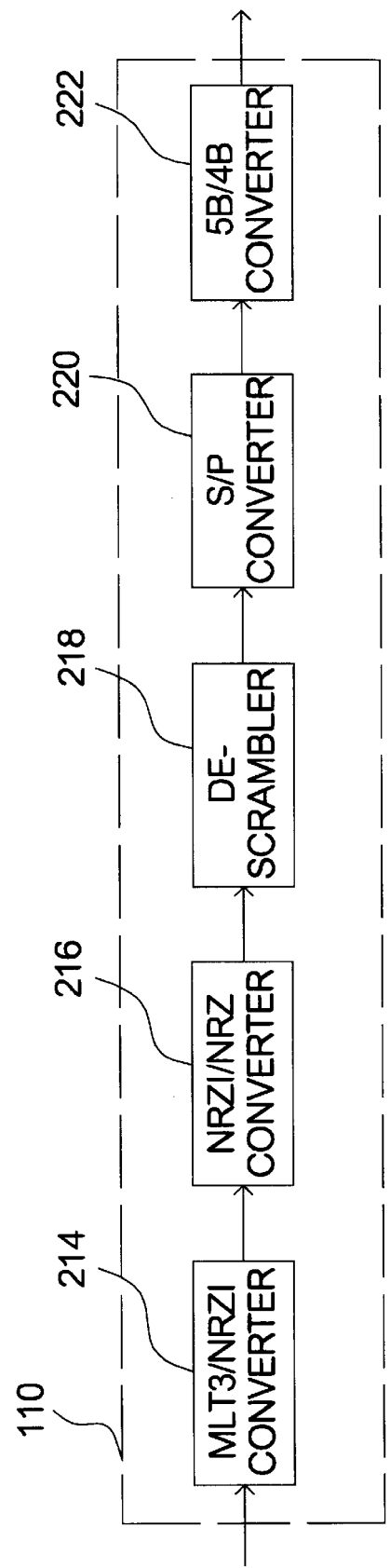
FIG. 2B (Prior Art) is a block diagram illustrating the internal structure of the PHY 110 of the receiving end shown in FIG. 1.
Figure 3A:
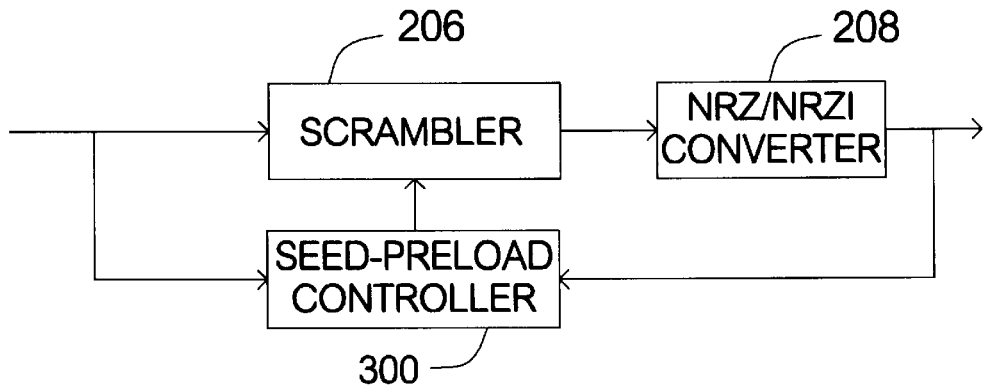
FIG. 3A is a block diagram illustrating an apparatus of loading a pre-load seed for a test code of a PHY in the transmitting end according to the invention.

Please refer to FIG. 3A, which shows an embodiment of the invention loading a pre-load seed for a test code of a PHY in a transmitter. When detecting the starting bits of a frame in a test code mode, the seed-preload controller 300 sends out a loading seed signal to the scrambler 206. In addition, the seed-preload controller 300 is used to prevent the NRZI signal from staying in a low level. Then, a pre-load seed is loaded into the scrambler 206 and is scrambled with 5B symbols. Next, the scrambler 206 outputs an NRZ signal to the NRZ/NRZI converter 208.

Figure 3B:
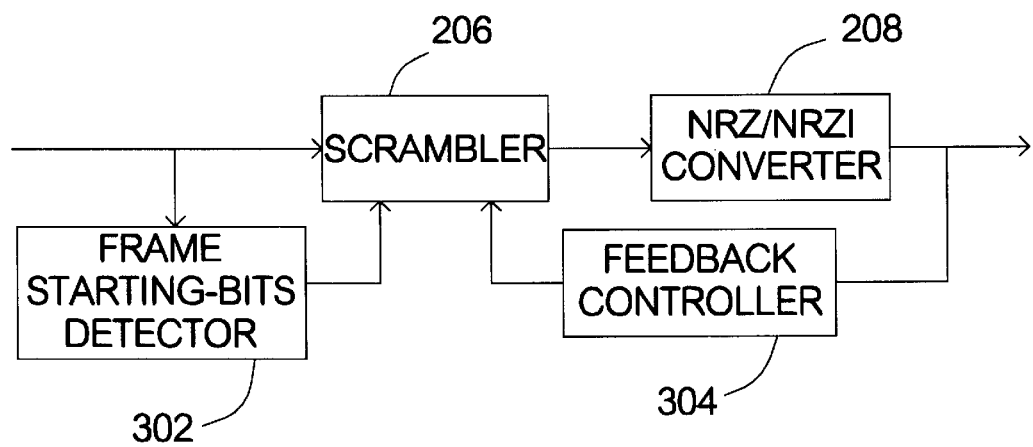
FIG. 3B is a block diagram illustrating another example of an apparatus of loading a pre-load seed for a test code of a PHY in the transmitting end according to the invention.

Referring to FIG. 3B, as an example in a transmitting end, a frame starting-bits detector 302 is connected to the scrambler 206. In the test code mode, when the frame starting-bits detector 302 detects the starting bits of a frame, it outputs a loading seed signal to the scrambler 206. Next, a pre-load seed is loaded into the scrambler 206 and is scrambled with 5B symbols. Then, the scrambler 206 outputs an NRZ signal to the NRZ/NRZI converter 208. Moreover, in FIG. 3B, a feedback controller 304 is used to prevent the NRZI signal from staying in the low level. Later, the relationship among these signals and the 5B symbols will be shown in FIGS. 5A and 5B.

Figure 3C:
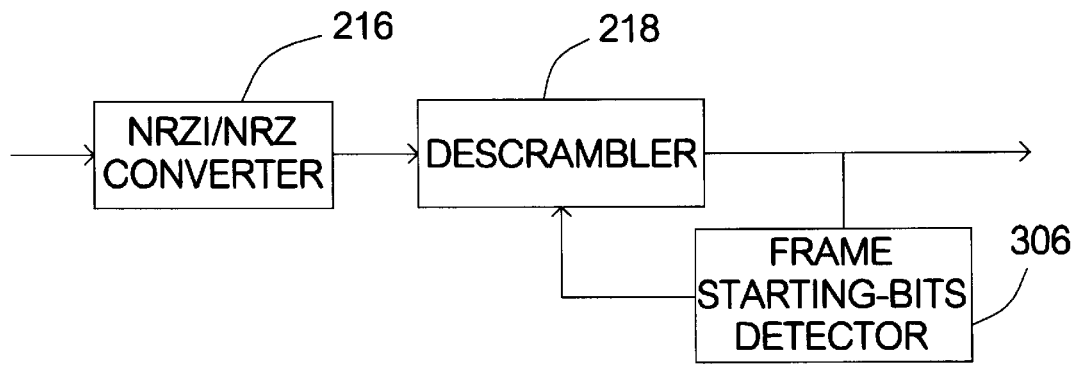
FIG. 3C is a block diagram illustrating an apparatus of pre-loading a seed for a test code of a PHY in the receiving end according to the invention.

Referring to FIG. 3C, while testing, a frame starting-bits detector 306 is used to detect the starting bits of a frame in a receiver. When they are detected, the frame starting-bits detector 306 outputs a loading seed signal to the descrambler 218. Then, a pre-load seed is loaded into the descrambler 218 and is descrambled with the output, i.e. the test pattern for baseline wander measurements, of the NRZI/NRZ converter 216, so as to recover the original data. Please note that there is no feedback of NRZI signal since there is no need to consider whether the NRZI signal is kept in the low level or not in the receiving end.

Figure 4:
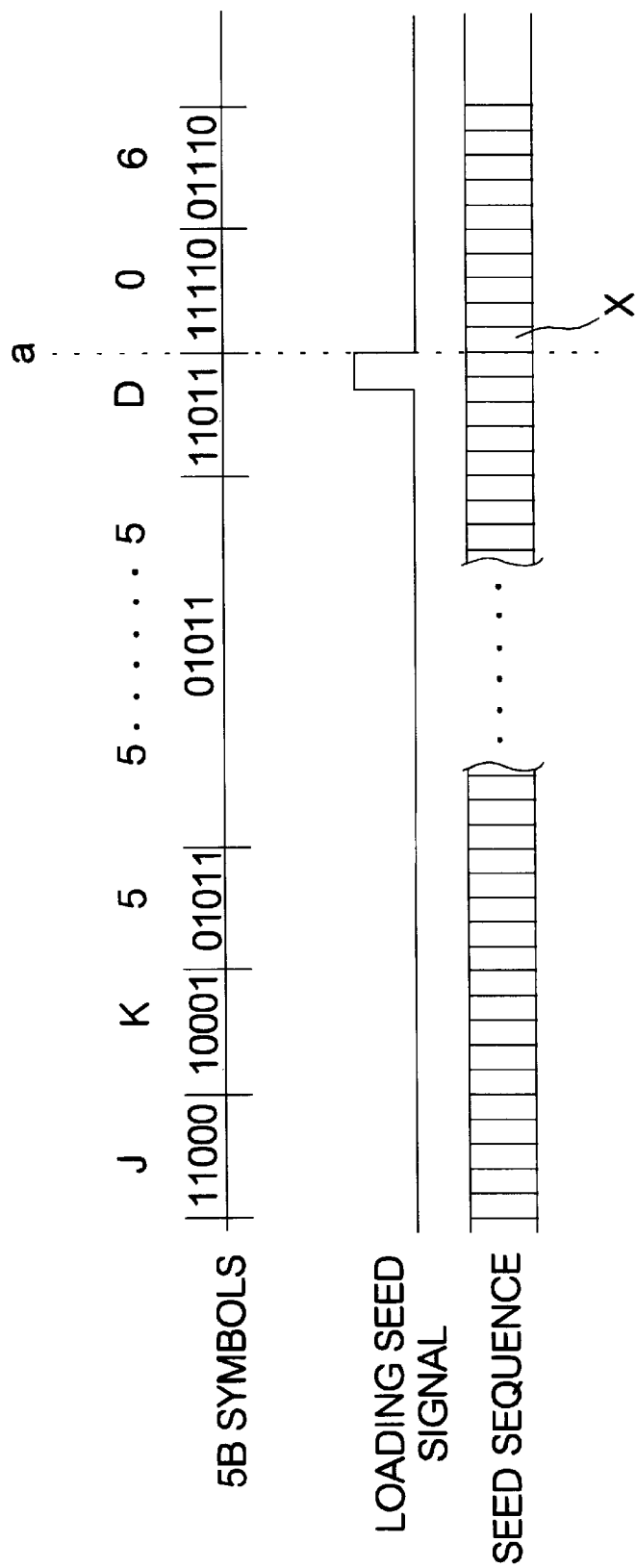
FIG. 4 is a timing diagram illustrating the timing of a seed signal of an apparatus of loading a pre-load seed for a test code of a PHY according to the invention.

Referring to FIG. 4, the 5B symbols before the dotted line "a" are the starting bits of a frame, in the form of J, K, 5, . . . , 5, D. The 5B symbols after the dotted line "a" are the body of the test code. In the test code mode, when the frame starting-bits detector 302 detects the starting bits of the frame, the loading seed signal is asserted and, for example, activated to a high level. Then, a correct seed sequence is loaded to the scrambler 206 so as to correctly scramble a test code. In FIG. 4, the symbol X represents the beginning of a correct seed sequence.

In FIG. 3B, the output of the NRZ/NRZI converter 208 is fed back to the scrambler 206 by the feedback controller 304 to prevent the NRZI signal from staying in the low level. If the NRZI signal stays in the low level, then the MLT3 signal stays in a high-impedance level and leads to a result that the base line wander phenomenon cannot be tested. In other words, the quality of the PHY cannot be tested by using the test code. There are three levels for the MLT3 signal, that is, the high level, the high-impedance level, and the low level, wherein the high-impedance level is between the high and low level.

To prevent the MLT3 signal from staying in the high-impedance level, the NRZI signal is fed back to the scrambler 206 by the feedback controller 304. An illustration is made with reference to FIGS. 5A and 5B.

Figure 5A:
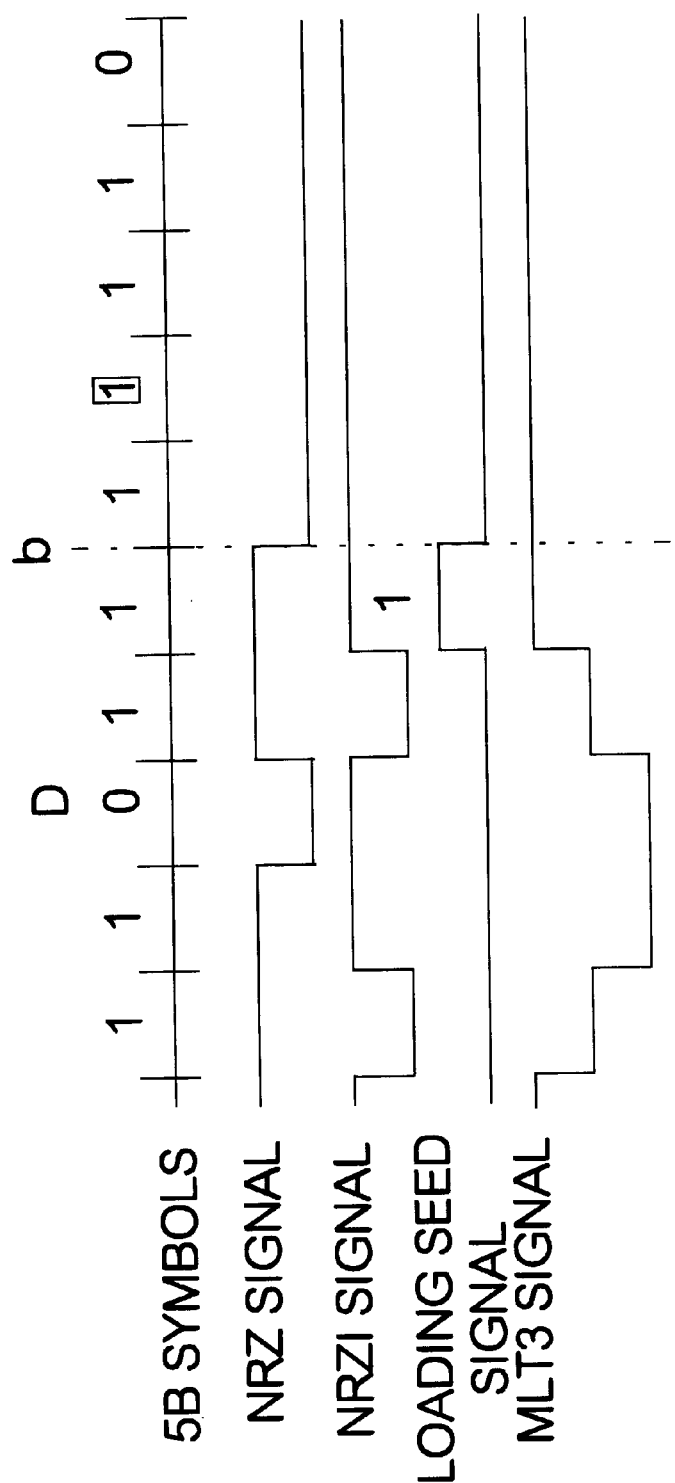
FIGS. 5A and 5B are timing diagrams of signals fed back by the NRZI signal in FIG. 3B.

Referring to FIG. 5A, the 5B symbol after the dotted line "b" is the first 5B symbol of the test code. When the loading seed signal is in the high level and the NRZI signal is in the high level, the first 5B symbol is scrambled with the correct seed sequence and the result is outputted.

Figure 5B:
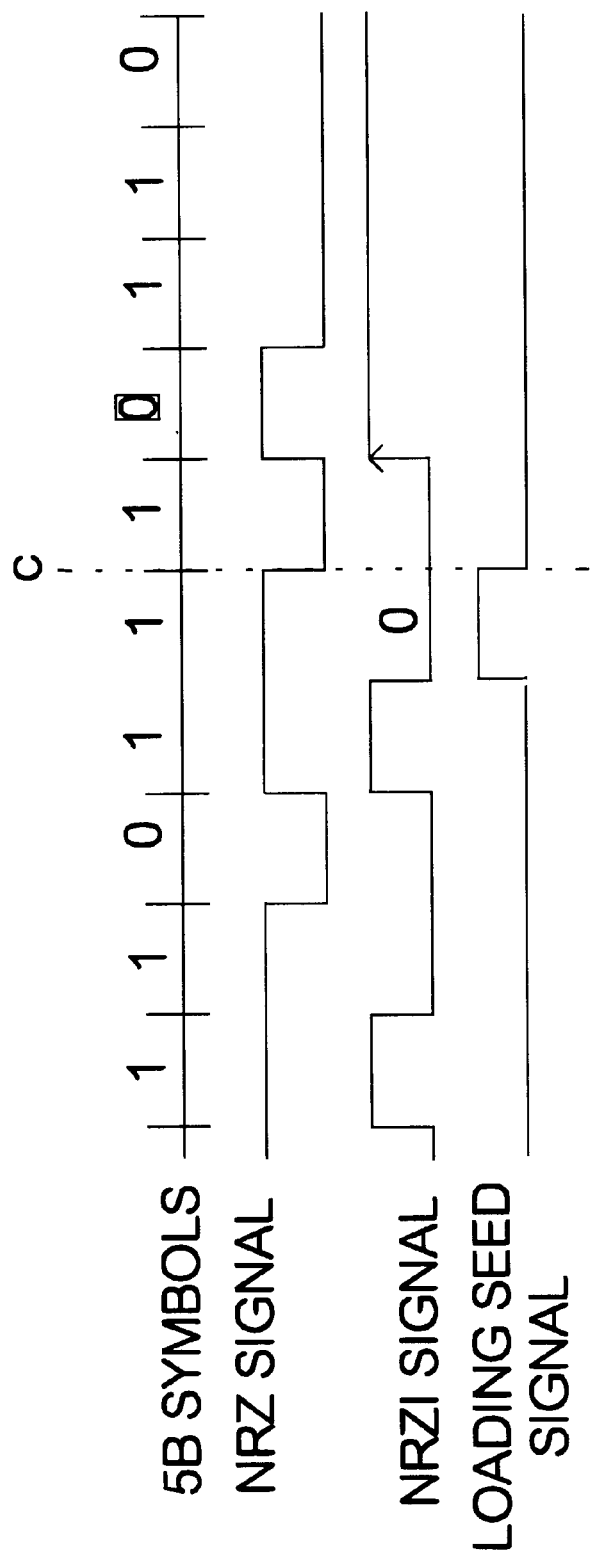

On the other hand, referring to FIG. 5B, when the loading seed signal is in the high level and the NRZI signal is in the low level, the level of one of the bits in the first 5B symbol of the test code is changed, wherein the first 5B symbol is right after the dotted line "c". For example, in FIG. 5B, the 5B symbol, (1, 1, 1, 1, 0) is changed to be (1, 0, 1, 1, 0). In this way, the NRZI signal can be prevented from staying in the low level so as to prevent the MLT3 signal from staying in the high-impedance level. As a result, the problem of not being able to test the quality of PHY by using the test code is solved. Therefore, in FIG. 3B, the feedback controller 304 is employed to prevent the NRZI signal from staying in the low level.

Referring to FIGS. 3B and 3C, the apparatuses of loading a pre-load seed for a test code of PHYs respectively in the transmitting end and the receiving end are substantially in a same PHY because a PHY in a computer network has both the functions of transmitting and receiving data.

Figure 6A:
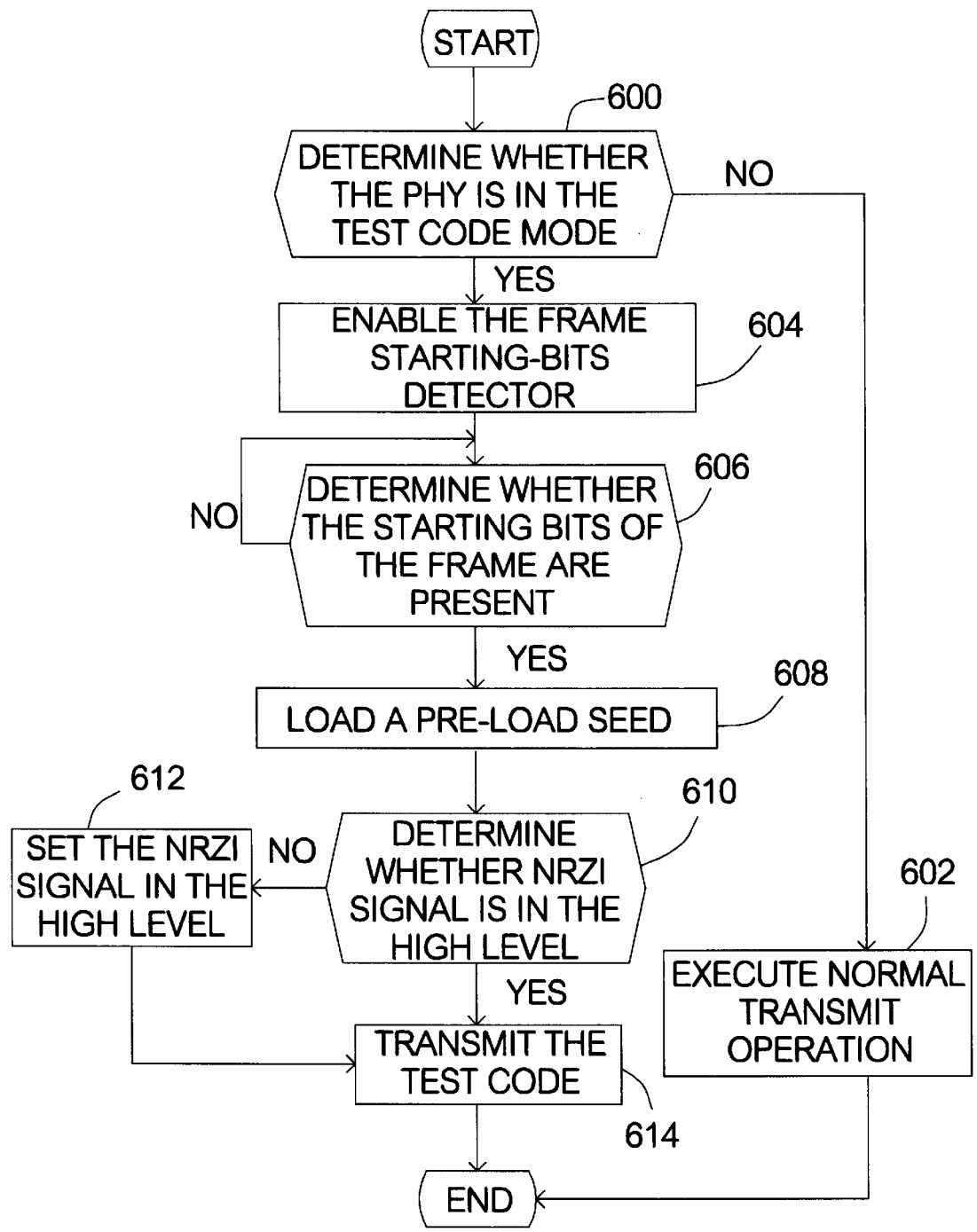
FIG. 6A is a flow chart illustrating a method of loading a pre-load seed for a test code of a PHY in a transmitting end according to the invention.

Referring to FIG. 6A, it illustrates the method of pre-loading a seed for a test code of a PHY in the transmitting end according to the invention. In step 600, determine whether PHY is in the test code mode. If not, step 602 is executed, and normal transmission occurs. If the PHY is in the test code mode, step 604 is executed. In step 604, the frame starting-bits detector is enabled. Then, in step 606, determine whether the starting bits of a frame are present. If not, step 606 is repeated. If the starting bits of a frame are present, step 608 is executed and a pre-load seed is loaded. Next, in step 610, it is determined whether NRZI signal is in the high level. If NRZI signal is in the high level, step 614 is executed. In step 614, the test code is transmitted. If NRZI signal is not in the high level, step 612 is executed. In step 612, the NRZI signal is set in the high level. Then, in step 614, the test code is transmitted.

Figure 6B:
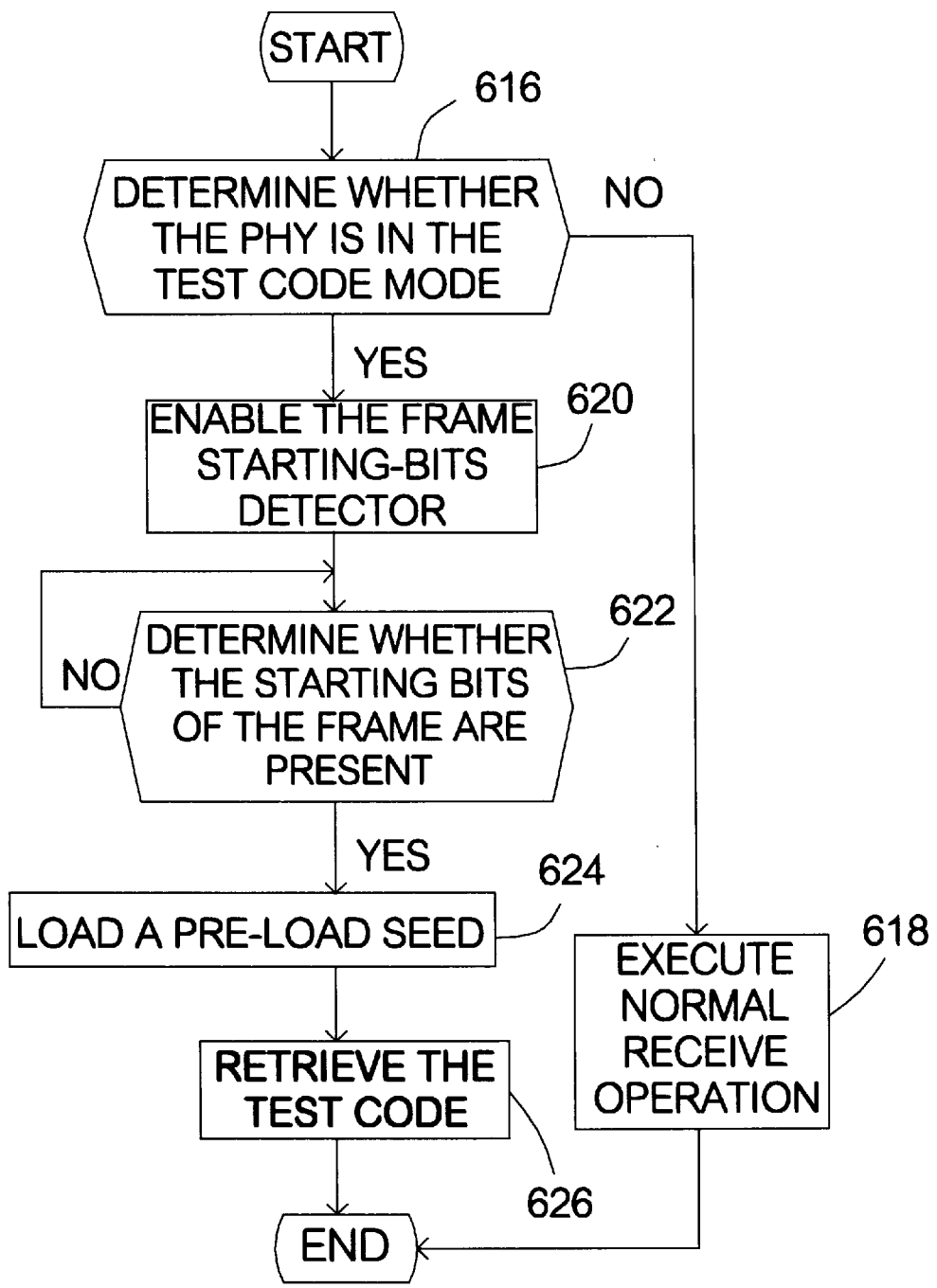
FIG. 6B is a flow chart illustrating a method of loading a pre-load seed for a test code of a PHY in a receiving end according to the invention.

Referring to FIG. 6B, it illustrates the method of pre-loading a seed for a test code of a PHY in the receiving end according to the invention. In step 616, whether PHY is in the test code mode is determined. If not, step 618 is executed, and normal receiving operation is performed. On the other hand, if the PHY is in the test code mode, step 620 is executed. In step 620, the frame starting-bits detector is enabled. Then, in step 622, determine whether the starting bits of a frame are present. If not, step 622 is repeated. If the starting bits of a frame are present, step 624 is executed. In step 624, a pre-load seed is loaded. Then, in step 626, the test code is retrieved.

The method and apparatus of loading a pre-load seed for a test code of a PHY disclosed in the above preferred embodiment provides an efficient and cost-down solution to test a PHY, for example, for an IC designer. By the feedback of the NRZI signal, the NRZI signal can be prevented from staying in the low level so as to prevent the MLT3 signal from staying in the high resistance level. As a result, the present invention also facilitates testing the quality of a PHY by generating a test code, such as a test pattern for baseline wander measurements, and pre-loading a correct seed on the bench board.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of loading a pre-load seed for a test code of a physical layer device (PHY), wherein the PHY comprises a scrambler and a Non-Return-to-Zero/Non-Return-to-Zero-Inverted (NRZ/NRZI) converter, and the NRZ/NRZI converter is connected to the scrambler, receives an NRZ signal outputted by the scrambler, and outputs an NRZI signal, the method comprising the steps of:

(a) determining whether a plurality of starting bits of a frame are present in a first signal which corresponds to the test code, wherein the scrambler receives the first signal and outputs the NRZ signal;

(b) performing step (c) if the starting bits are present; otherwise, repeating from said step (a) if the starting bits are not present;

(c) loading the pre-load seed for the test code to the scrambler to correctly scramble the first signal which corresponds to the test code;

(d) setting the NRZI signal in a high level when the NRZI signal is not in the high level, and keeping the NRZI signal in the high level when the NRZI signal is in the high level; and (e) transmitting the test code;

wherein the method facilitates correct transmission of the test code for PHY testing when the PHY is in a test code mode.

2. A method according to claim 1, wherein the test code corresponds to a test pattern for baseline wander measurements defined in ISO9314-1.

3. A method according to claim 1, wherein the starting bits of the frame are in a form of J, K, 5, . . . , 5, D.

4. A method according to claim 1, wherein between said steps (d) and (e), the method further comprises converting the NRZI signal to a multiple-level-transition-3 (MLT3) signal for transmission of the test code, wherein said step (d) prevents the NRZI signal from staying in a low level so as to prevent the multiple-level-transmit 3 (MLT3) signal from staying in a high-impedance level, thereby allowing correct transmitting of the test code.

5. A method of loading a pre-load seed of a test code in a physical layer device (PHY), wherein the PHY comprises a descrambler which outputs a descrambled output signal, the method comprising the steps of:

(a) determining whether a plurality of starting bits of a frame are present in the descrambled output signal, wherein the descrambled output signal corresponds to the test code; and (b) loading the pre-load seed for the test code to the descrambler to correctly recover the test code when the starting bits are present in the descrambled output signal;

wherein the method facilitates correct receiving of the test code for PHY testing when the PHY is in a test code mode.

6. A method according to claim 5, wherein the test code corresponds to a test pattern for baseline wander measurements defined in ISO9314-1.

7. A method according to claim 5, wherein the starting bits of the frame are in a form of J, K, 5, . . . , 5, D.

8. An apparatus of loading a pre-load seed for a test code of a physical layer device (PHY), wherein the PHY comprises a scrambler which receives a first signal corresponding to the test code and a Non-Return-to-Zero/Non-Return-to-Zero-Inverted (NRZ/NRZI) converter for receiving an NRZ signal outputted by the scrambler and outputting an NRZI signal, the apparatus comprising:

a seed-preload controller which receives the first signal inputted to the scrambler and the NRZI signal, for detecting whether the first signal comprises a plurality of starting bits of a frame corresponding to the test code when the PHY is in a test code mode, wherein the seed-preload controller outputs a loading seed signal to the scrambler when the first signal comprises the starting bits, and the pre-load seed for the test code is loaded into the scrambler when the scrambler receives the loading seed signal, and when the scrambler receives the first loading seed signal, the seed-preload controller is for keeping the NRZI signal in a high level when the NRZI is in the high level, and for setting the NRZI signal in the high level when the NRZI is in a low level;

wherein the PHY correctly transmits the test code when the PHY is in the test code mode, thereby facilitating PHY testing.

9. An apparatus according to claim 8, wherein when the loading seed signal is asserted and the NRZI signal is in the low level, the seed-preload controller sets the NRZI signal in the high level by changing a bit of a first symbol of the test code.

10. An apparatus according to claim 8, wherein the seed-preload controller comprises:

a frame starting-bits detector which receives the first signal, for detecting whether the first signal comprises the plurality of starting bits of the frame, and for outputting the loading seed signal to the scrambler when the first signal comprises the starting bits; and a feedback controller which receives the NRZI signal, when the scrambler receives the first loading seed signal, the feedback controller being for keeping the NRZI signal in the high level when the NRZI is in the high level, and for setting the NRZI signal in the high level when the NRZI is in the low level.

11. An apparatus according to claim 10, wherein when the loading seed signal is asserted and the NRZI signal is in the low level, the feedback controller sets the NRZI signal in the high level by changing a bit of a first symbol of the test code.

12. An apparatus according to claim 8, wherein the test code corresponds to a test pattern for baseline wander measurements defined in ISO9314-1.

13. An apparatus according to claim 8, wherein the starting bits of the frame are in a form of J, K, 5, . . . , 5, D.

14. An apparatus according to claim 8, wherein the PHY further comprises a Non-Return-to-Zero-Inverted/multiple-level-transition-3 (NRZI/MLT3) converter to convert the NRZI signal to an MLT3 (multiple-level-transmit 3) signal for transmission of the test code, wherein when the NRZI is in the low level, the seed-preload controller keeps the NRZI signal in the high level so as to prevent the (MLT3) signal from staying in a high-impedance level.

15. An apparatus for loading a pre-load seed for a test code in a physical layer device (PHY), the PHY having a descrambler outputting a descrambled output signal, the apparatus comprising:

a frame starting-bits detector which receives the descrambled output signal of the descrambler, for detecting whether the descrambled output signal comprises the starting bits of a received frame corresponding to the test code when the PHY is in the test code mode, wherein the frame starting-bits detector outputs a loading seed signal to the descrambler when the descrambled output signal comprises the starting bits, and the pre-load seed for the test code is loaded into the descrambler to recover the test code when the descrambler receives the loading seed signal;

wherein the PHY correctly receives the test code when the PHY is in the test code mode and the received frame corresponds to the test code, thereby facilitating PHY testing.

16. An apparatus according to claim 15, wherein the test code corresponds to a test pattern for baseline wander measurements defined in ISO9314-1.

17. An apparatus according to claim 15, wherein the starting bits of the frame are in a form of J, K, 5, . . . , 5, D.

18. An apparatus according to claim 15, wherein the frame starting-bits detector is integrated into the descrambler.

19. A physical layer device (PHY) for transmitting and receiving data, the PHY comprising:

a scrambler for scrambling a first signal corresponding to a frame to be transmitted and outputting an NRZ signal;

a Non-Return-to-Zero/Non-Return-to-Zero-Inverted (NRZ/NRZI) converter, which receives the NRZ signal outputted by the scrambler and outputs an NRZI signal;

a first frame starting-bits detector, which receives the first signal inputted to the scrambler, for detecting whether the first signal comprises a plurality of starting bits of the frame to be transmitted when the PHY is in a test code mode, wherein the first frame starting-bits detector outputs a first loading seed signal to the scrambler when the starting bits of the frame to be transmitted are detected, and a pre-load seed for a test code is loaded into the scrambler when the scrambler receives the first loading seed signal;

a feedback controller, which receives the NRZI signal, wherein when the scrambler receives the first loading seed signal, the feedback controller keeps the NRZI signal in a high level when the NRZI signal is in the high level, and sets the NRZI signal in the high level when the NRZI is in a low level;

a descrambler outputting a descrambled output signal corresponding to a received frame; and a second frame starting-bits detector, which receives the descrambled output signal of the descrambler, for detecting whether the descrambled output signal comprises a plurality of starting bits of the received frame when the PHY is in the test code mode, wherein the second frame starting-bits detector outputs a second loading seed signal to the descrambler when the descrambled output signal comprises the starting bits of the received frame, and the pre-load seed for the test code is loaded into the descrambler to recover the test code when the descrambler receives the second loading seed signal;

wherein the PHY correctly transmits the test code when the PHY is in the test code mode and the frame to be transmitted corresponds to the test code; and the PHY correctly receives the test code when the PHY is in the test code mode and the received frame corresponds to the test code, whereby the PHY facilitates PHY testing.

20. A physical layer device according to claim 19, wherein when the first loading seed signal is asserted and the NRZI signal is in the low level, the feedback controller sets the NRZI signal in the high level by changing a bit of a first symbol of the test code.

* * * * *